United States Patent
Sobieski et al.

(10) Patent No.: US 10,885,253 B2
(45) Date of Patent: Jan. 5, 2021

(54) SYSTEM AND METHOD FOR DETERMINING DIMENSIONAL RANGE OF REPAIRABLE DEFECTS BY DEPOSITION AND ETCHING IN A VIRTUAL FABRICATION ENVIRONMENT

(71) Applicant: Coventor, Inc., Cary, NC (US)

(72) Inventors: Daniel Sobieski, Hillsboro, OR (US); Rich Wise, Los Gatos, CA (US); Yang Pan, Fremont, CA (US); David M. Fried, South Salem, NY (US); Jiangjiang Gu, San Carlos, CA (US)

(73) Assignee: Coventor, Inc., Cary, NC (US)

( * ) Notice: Subject to any disclaimer, the term of this patent is extended or adjusted under 35 U.S.C. 154(b) by 0 days.

(21) Appl. No.: 16/662,778

(22) Filed: Oct. 24, 2019

(65) Prior Publication Data
US 2020/0134117 A1    Apr. 30, 2020

Related U.S. Application Data

(60) Provisional application No. 62/750,575, filed on Oct. 25, 2018.

(51) Int. Cl.
| | | |
|---|---|---|
| G06F 30/367 | (2020.01) | |
| G06T 17/10 | (2006.01) | |
| G03F 7/004 | (2006.01) | |
| G03F 7/00 | (2006.01) | |
| G03F 7/20 | (2006.01) | |
| G06F 30/20 | (2020.01) | |
| G06F 119/18 | (2020.01) | |

(52) U.S. Cl.
CPC .......... *G06F 30/367* (2020.01); *G03F 7/0002* (2013.01); *G03F 7/0041* (2013.01); *G06T 17/10* (2013.01); *G03F 7/705* (2013.01); *G06F 30/20* (2020.01); *G06F 2119/18* (2020.01); *Y02P 90/02* (2015.11)

(58) Field of Classification Search
CPC .... G06F 30/367; G06F 2119/18; G06F 30/20; G06T 17/10; G03F 7/0041; G03F 7/0002; G03F 7/70558; G03F 7/705; Y02P 90/02
See application file for complete search history.

(56) References Cited

U.S. PATENT DOCUMENTS

| | | | | |
|---|---|---|---|---|
| 2019/0266306 A1* | 8/2019 | Greiner | .................. | G06F 30/39 |
| 2019/0286780 A1* | 9/2019 | Greiner | .................. | G06F 30/39 |
| 2020/0218844 A1* | 7/2020 | Feng | ........................ | G03F 1/86 |

OTHER PUBLICATIONS

Coventor, Inc., "SEMulator3D Overview", 2012 obtained at http://www.ednc.com/wp/wp-content/uploads/2012/10/SEMulator3D2012.pdf pp. 1-18. (Year: 2012).*

(Continued)

*Primary Examiner* — Stacy Whitmore
(74) *Attorney, Agent, or Firm* — McCarter & English, LLP; John S. Curran

(57) ABSTRACT

A virtual fabrication environment for semiconductor device fabrication that determines a lowest lithography exposure dose range in which one or more defects are still reparable by deposition and etch operations is discussed. Further techniques for repairing line edge roughness caused by lithography are described.

21 Claims, 15 Drawing Sheets

(56) References Cited

OTHER PUBLICATIONS

Coventor, inc., "Coventor Enhances SEMulator3D Virtual Fabrication Platform to Address Advanced 3D Process Development Challenges" obtained at https://www.coventor.com/press-releases/coventor-enhances-semulator3d/ on 9 1 20, pp. 1-2. (Year: 2014).*

Wu, Cheng-En, et al., "Photoresist 3D profile related etch process simulation and its application to full cheip etch compact modeling", SPIE Advanced lithography, 2015, San Jose, California, United States , pp. 1-15. (Year: 2015).*

* cited by examiner

Figure 11

| Assembly File | C:\STI_Example\Virtual_3way_Grid\STI_Example.ram |
| Process File | C:\STI_Example\Virtual_3way_Grid\STI_Example.vprocc |
| Layout File | C:\STI_Example\Virtual_3way_Grid\STI_Demo_Layouts.cat |
| Layer Map File | |
| Top Cell | Cell6x6 |
| Output directory | STI_Example_batch |
| Working directory | C:\STI_Example\Virtual_3way_Grid |

| Run | 1_1.depth | 1_22.depth | 2.depth | STP_STPG_DCI | THK_STPFIN_STI | STP_STPG_PNS | STP_STPG_GBD |
|---|---|---|---|---|---|---|---|
| 0 (1) | 15.5 | 52.5 | 2 | 24.381696 | 167 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.37036 | 4.127793 |
| 3 (4) | 22.25 | 52.5 | 2 | 33.899625 | 157 | 2.116466 | 0.866027 |
| 4 (5) | 24.5 | 52.5 | 2 | 37.047595 | 154 | NaN | NaN |
| 5 (6) | 15.5 | 56.25 | 2 | 24.381696 | 167 | 11.671823 | 10.651568 |
| 6 (7) | 17.75 | 56.25 | 2 | 27.539265 | 164 | 8.582142 | 7.317439 |
| 7 (8) | 20 | 56.25 | 2 | 30.732833 | 160 | 5.269715 | 4.032957 |
| 8 (9) | 22.25 | 56.25 | 2 | 33.890625 | 157 | 2.012943 | 0.788521 |
| 9 (10) | 24.5 | 56.25 | 2 | 37.047595 | 153 | NaN | NaN |
| 10 (11) | 15.5 | 60 | 2 | 24.381696 | 167 | 11.793147 | 10.529036 |
| 11 (12) | 17.75 | 60 | 2 | 27.539265 | 163 | 8.481802 | 7.22371 |
| 12 (13) | 20 | 60 | 2 | 30.732833 | 160 | 5.165463 | 3.942212 |
| 13 (14) | 22.25 | 60 | 2 | 33.890625 | 157 | 1.884331 | NaN |
| 14 (15) | 24.5 | 60 | 2 | 37.047595 | 153 | NaN | NaN |
| 15 (16) | 15.5 | 63.75 | 2 | 24.381696 | 167 | 11.693668 | 10.415309 |
| 16 (17) | 17.75 | 63.75 | 2 | 27.539265 | 163 | 8.37849 | 7.159459 |

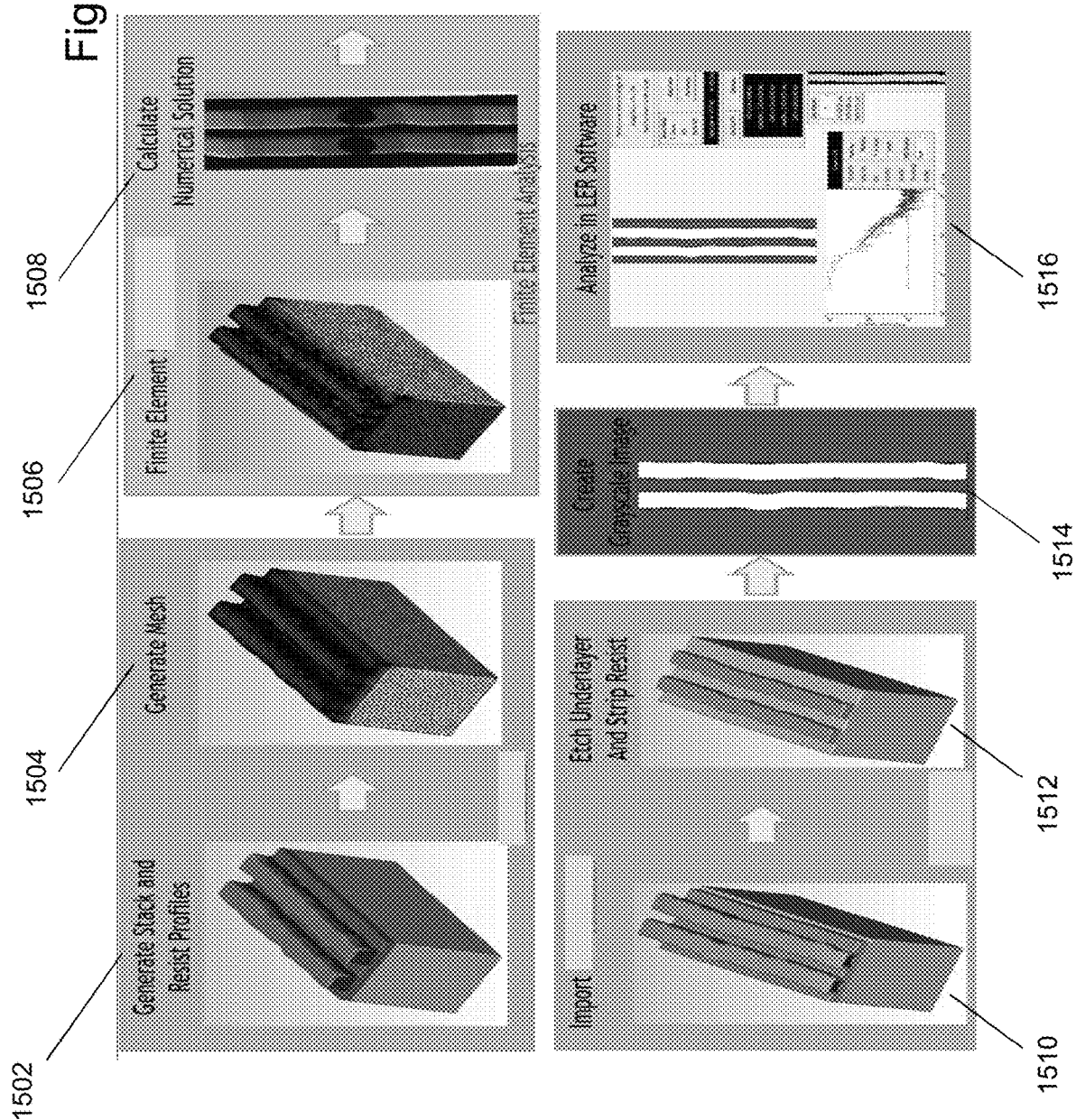

SYSTEM AND METHOD FOR DETERMINING DIMENSIONAL RANGE OF REPAIRABLE DEFECTS BY DEPOSITION AND ETCHING IN A VIRTUAL FABRICATION ENVIRONMENT

RELATED APPLICATION

This application claims the benefit of, and priority to, U.S. Provisional Patent Application No. 62/750,575, filed Oct. 25, 2018, the contents of which are incorporated herein by reference in their entirety.

BACKGROUND

Integrated circuits (ICs) implement a myriad of capabilities of modern electronic devices. To make the development of ICs more efficient, a semiconductor manufacturer will periodically develop a common fabrication process or "technology" to be used for production of its integrated circuits (for ease of explanation the term "technology" may be used herein to refer to a fabrication process for a semiconductor device structure that is being developed).

Semiconductor development organizations at integrated device manufacturers (IDMs) and independent foundries spend significant resources developing the integrated sequence of process operations used to fabricate the chips ((ICs) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive. Recent semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

A virtual fabrication environment for semiconductor device structures offers a platform for performing semiconductor process development at a lower cost and higher speed than is possible with conventional trial-and-error physical experimentation. Further, in contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

BRIEF SUMMARY

Embodiments of the present invention provide a virtual fabrication environment suitable for determining a dimensional range of repairable defects arising from the use of Extreme Ultraviolet Lithography (EUV) or other types of lithography in the fabrication process. More particularly embodiments enable the identification of a range of repairable defects using deposition and etching techniques. Embodiments also enable the identification of the lowest exposure dose range in which lithography related defects are still reparable by the deposition and etch techniques. Embodiments further enable the modeling of line edge roughness stemming from EUV or other types of lithographic patterning and the modeling of the ability to smooth line roughness using deposition and etch techniques. Additionally embodiments identify the effect of the defect mitigation techniques on improvements to line roughness after pattern transfer.

In one embodiment, a computing device-implemented method for performing defect mitigation caused by lithography exposure in a virtual semiconductor fabrication environment includes receiving or creating a physical design pattern in a virtual fabrication environment to model defects from lithography exposure during fabrication of a semiconductor device structure. The method also includes receiving in a virtual fabrication environment material selectivity and resist profile information for use in virtual fabrication of a 3D model of the semiconductor device structure. The method additionally includes performing in the virtual fabrication environment a virtual experiment performing multiple virtual fabrication runs using the physical design pattern and material selectivity and resist profile information to create multiple 3D models of the semiconductor device structure and performing deposition and etching operations on one or more defects in the 3D models using one or more experimentally-controlled parameters. The method also includes determining a remaining defect quantity for each of the 3D models created by the virtual experiment following the performing of the deposition and etching operations and identifying, based on the remaining defect quantity for each of the 3D models created by the virtual experiment, a lowest lithography exposure dose or dose range at which the one or more defects are repairable by the deposition and etching operations In another embodiment, a virtual fabrication system includes at least one computing device equipped with one or more processors that is configured to execute instructions to provide a virtual fabrication environment. The virtual fabrication environment includes a defect mitigation module that when executed receives or creates a physical design pattern to model defects from lithography exposure during fabrication of a semiconductor device structure. The defect mitigation module when executed also receives in the virtual fabrication environment material selectivity and resist profile information for use in virtual fabrication of a 3D model of the semiconductor device structure. The defect mitigation module when executed also performs in the virtual fabrication environment a virtual experiment performing multiple virtual fabrication runs using the physical design pattern and material selectivity and resist profile information to create multiple 3D models of the semiconductor device structure and performs deposition and etching operations on one or more defects in the 3D models using one or more experimentally-controlled parameters. The defect mitigation module when executed further determines a remaining defect quantity for each of the 3D models created by the virtual experiment following the performing of the deposition and etching operations and identifies, based on the remaining defect quantity for each of the 3D models created by the virtual experiment, a lowest lithography exposure dose or dose range at which the one or more defects are repairable by the deposition and etching operations. The virtual fabrication system also includes a display surface in communication with the at least one computing device. The display surface is configured to display the 3D model in a 3D view.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 11 depicts an exemplary tabular-formatted display of virtual metrology data generated in a virtual experiment in the virtual fabrication environment;

FIG. 15 depicts an exemplary sequence of steps performed in the virtual fabrication environment to reduce line edge roughness in an exemplary embodiment.

DETAILED DESCRIPTION

Figure 1:
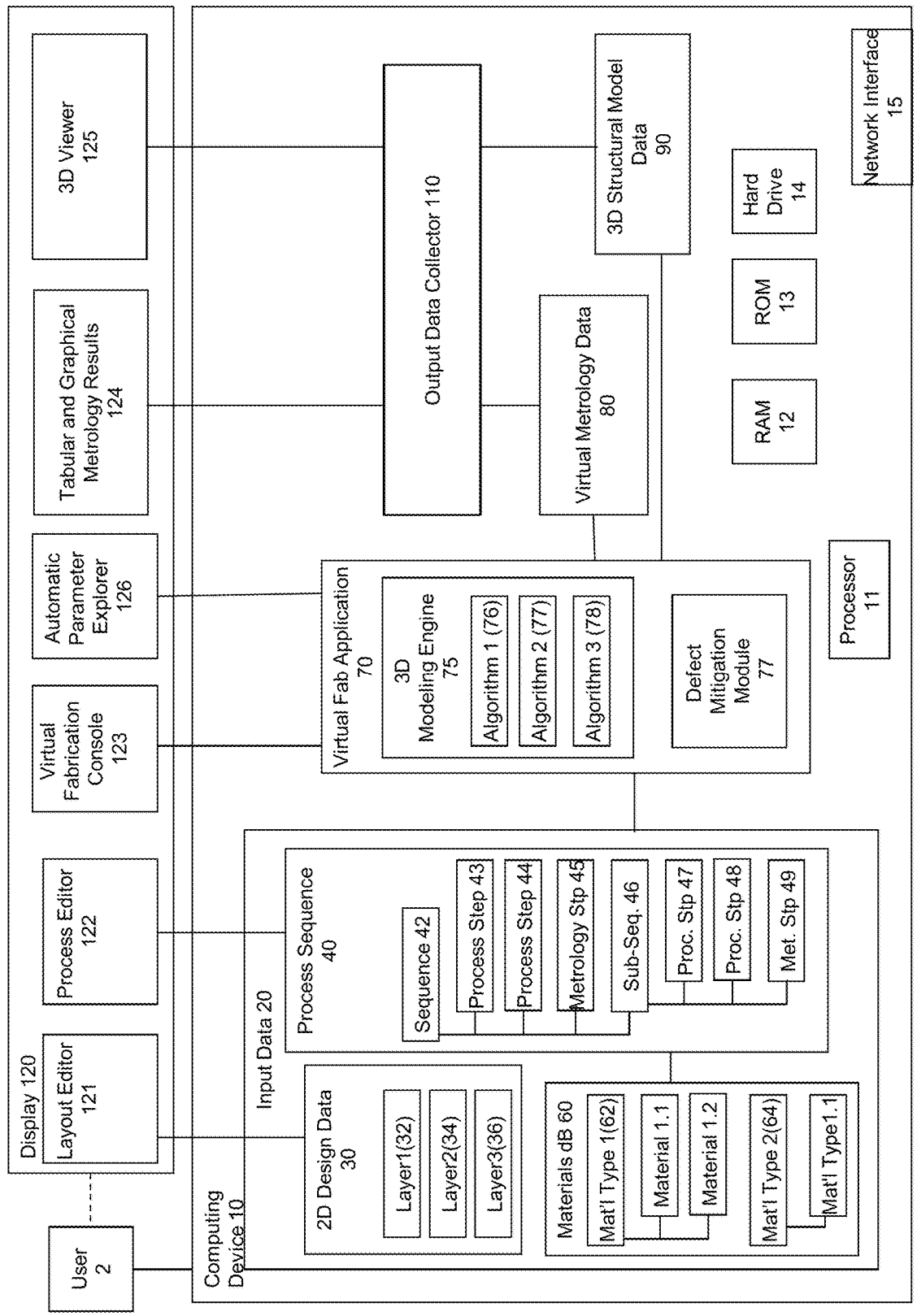
FIG. 1 depicts an exemplary virtual fabrication environment suitable for practicing an embodiment of the present invention.

As noted above, a virtual fabrication environment is capable of virtually modeling an integrated process flow and predicting the complete 3D structures of an integrated circuit. An exemplary virtual fabrication environment is described in U.S. patent application Ser. No. 16/010,537, the contents of which are incorporated by reference in their entirety. As part of the modeling of the integrated process flow, the virtual fabrication environment is able to model the patterning steps used in semiconductor fabrication including lithographic steps in which a substrate or parts of a thin film are patterned. Conventionally, photolithography has used light to transfer a geometric pattern (e.g. by projecting an image of a photomask) to a light sensitive photoresist on the substrate. A developer is used to remove the exposed or non-exposed portions of the resist and a series of etch and deposition steps are then used to create the pattern for the IC being fabricated.

Recent developments in lithographic techniques such as Extreme Ultraviolet (EUV) lithography (discussed further below) enable the creation of smaller, faster and more powerful chips using light with a much shorter wavelength (e.g. 13.5 nm) than the wavelength (193 nm) conventionally used in photolithography during semiconductor fabrication. However, due to the stochastic nature of an EUV lithography exposure, several different types of defects can arise in the developed image in resist. Two of these types of defects are breaks in the resist line and excess scum/residue in the pattern. First, notches in the resist line can form that can open completely during the underlayer or hard mask etch step and ultimately lead to line breaks. Second, remaining residue or scum between the resist features that should have been cleared during development can lead to bridging lines after the etch process. Due to the stochastic nature of these defects, they can be mitigated by using resists that require a higher exposure dose (higher photon flux). Unfortunately, the linear relationship between exposure dose and throughput time, makes this approach to defect mitigation costly and uneconomical.

Embodiments of the present invention utilize a virtual fabrication environment to determine the size of defects resulting from EUV lithography exposure that can be physically corrected using etch and deposition techniques (i.e. the minimum lithography performance and exposure dose required). Embodiments also determine a parameter space that should be explored thereby reducing the number of experiments needed to find an optimized process space for a given EUV-based condition. Additionally, embodiments also enable the modeling of line-edge roughness caused by EUV lithography exposure and can determine the minimum lithography performance that can be corrected by etch processes.

Prior to discussing the EUV lithography-specific features provided by embodiments of the present invention, an exemplary 3D design environment/virtual fabrication environment into which a defect mitigation module of the present invention may be integrated is first described.

Exemplary Virtual Fabrication Environment

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with one or more processors 11 and able to support the operations of virtual fabrication application, 70, 3D modeling engine 75 and defect mitigation module 77 (described further below). The processor(s) may have one or more cores. The computing device 10 may also include volatile and non-volatile storage such as, but not limited to, Random Access Memory (RAM) 12, Read Only Memory (ROM) 13 and hard drive 14. Computing device 10 may also be equipped with a network interface 15 so as to enable communication with other computing devices. It will be appreciated that computing device 10 rather than being a solitary computing device may also be implemented as a computing system with multiple computing devices working in parallel or other combination.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures.

Input data 20 includes both 2D design data 30 and process sequence 40. Process sequence 40 may be composed of multiple process steps 43, 44, 47, 48 and 49. As described further herein, process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. Alternatively, the measurement location may be specified by alternate means such as (x, y) coordinates in the 2D design data or some other means of specifying a location in the 2D design data 30 instead of through the use of a locator shape. The performance of the process sequence 40 during a virtual fabrication run generates virtual metrology data 80 and 3D structural model data 90. 3D structural model data 90 may be used to generate a 3D view of the structural model of the semiconductor device structure which may be displayed in the 3D viewer 125. Virtual metrology data 80 may be processed and presented to a user 2 in the tabular and graphical metrology results view 124.

Because of the large number of structural dimensions that are critical to the success of an integrated technology such as semiconductor devices, finding the relationship between the many inter-related process steps used to fabricate a device structure and the created structure is critical. As structural modifications produced by a step in the process sequence may be affected by previous and subsequent steps in the sequence, a particular step may affect a structural dimension in ways that are not obvious. A virtual fabrication environment enables automatic extraction of structural measurements from the device being created. The automatic extraction of a measurement is accomplished by specifying a virtual metrology measurement step in the process sequence at a point in the process when the measurement is critical. A locator shape for this virtual metrology measurement can be added to a layer in the design data and specified by the virtual metrology measurement step. The output data from this virtual metrology measurement can be used to provide quantitative comparison to other modeling results or to physical metrology measurements. This virtual metrology measurement capability is provided by during the processing sequence to extract a critical physical dimension at the correct point in the integrated process flow.

The ability to provide virtual metrology measurement data at specified locations in the device structure provides a significant improvement over conventional physical fab measuring techniques. Typically, physical in-fab measurements are done on specific characterization structures fabricated in the scribe lines or saw kerfs, adjacent to the product dice. In most cases, these characterization structures need to be designed to accommodate limitations of the measurement technique, such as optical spot size. Therefore, the characterization structures are not entirely representative of the actual structures on the product dice. Because of these differences, users of in-fab measurements usually face the challenge of inferring the result on the product structure from a measurement on a characterization structure. In the virtual fabrication environment, measurements can be added to any design layout at specified points in the process sequence thus providing greater insight into the effect of the inter-related process steps on the virtual structural model being constructed. As such, the in-fab challenge of measuring a characterization structure and inferring the result on a product structure is eliminated.

Figure 2:
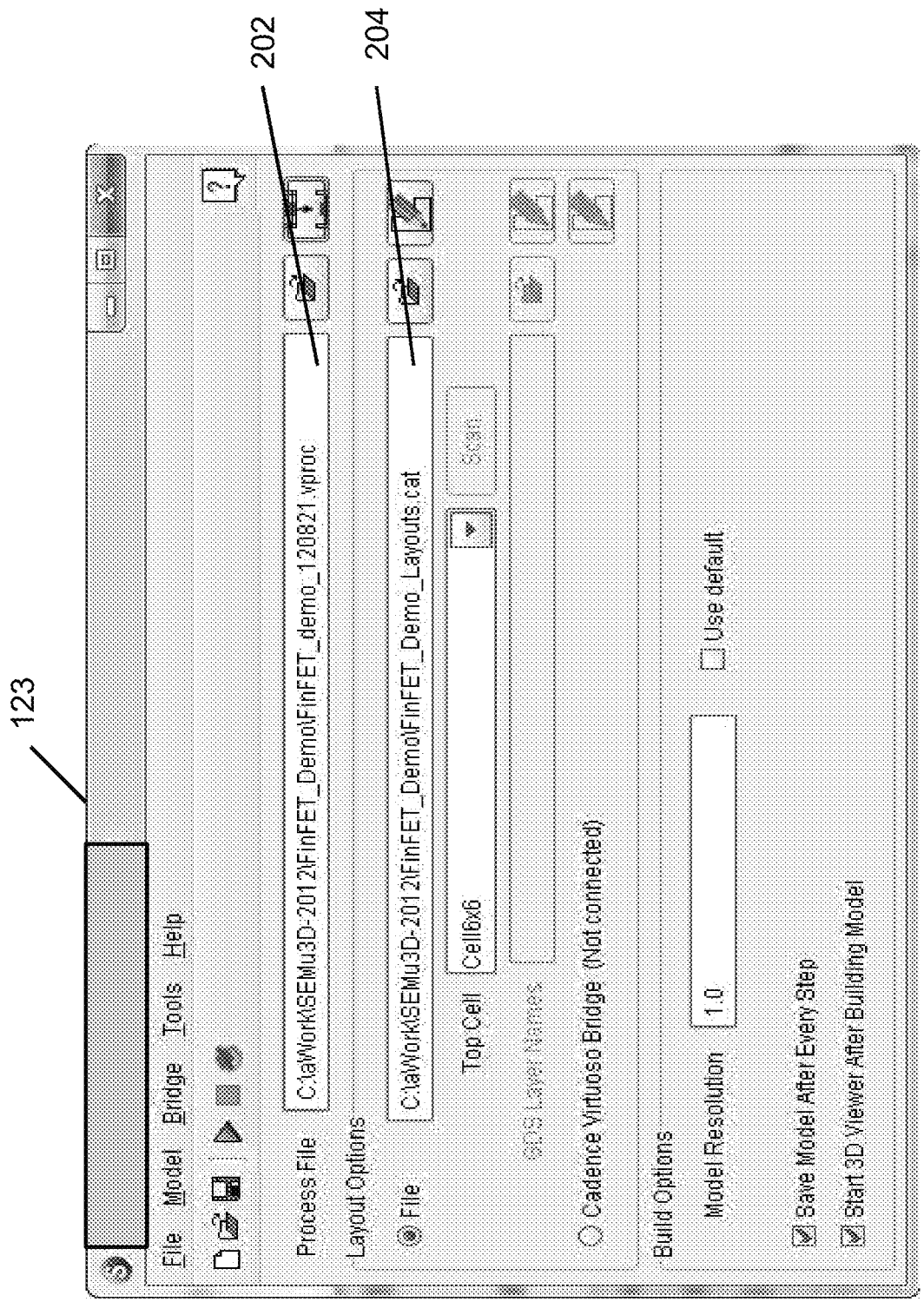
FIG. 2 depicts an exemplary virtual fabrication console in the virtual fabrication environment.

FIG. 2 depicts an exemplary virtual fabrication console 123 to set up a virtual fabrication run in the virtual fabrication environment. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
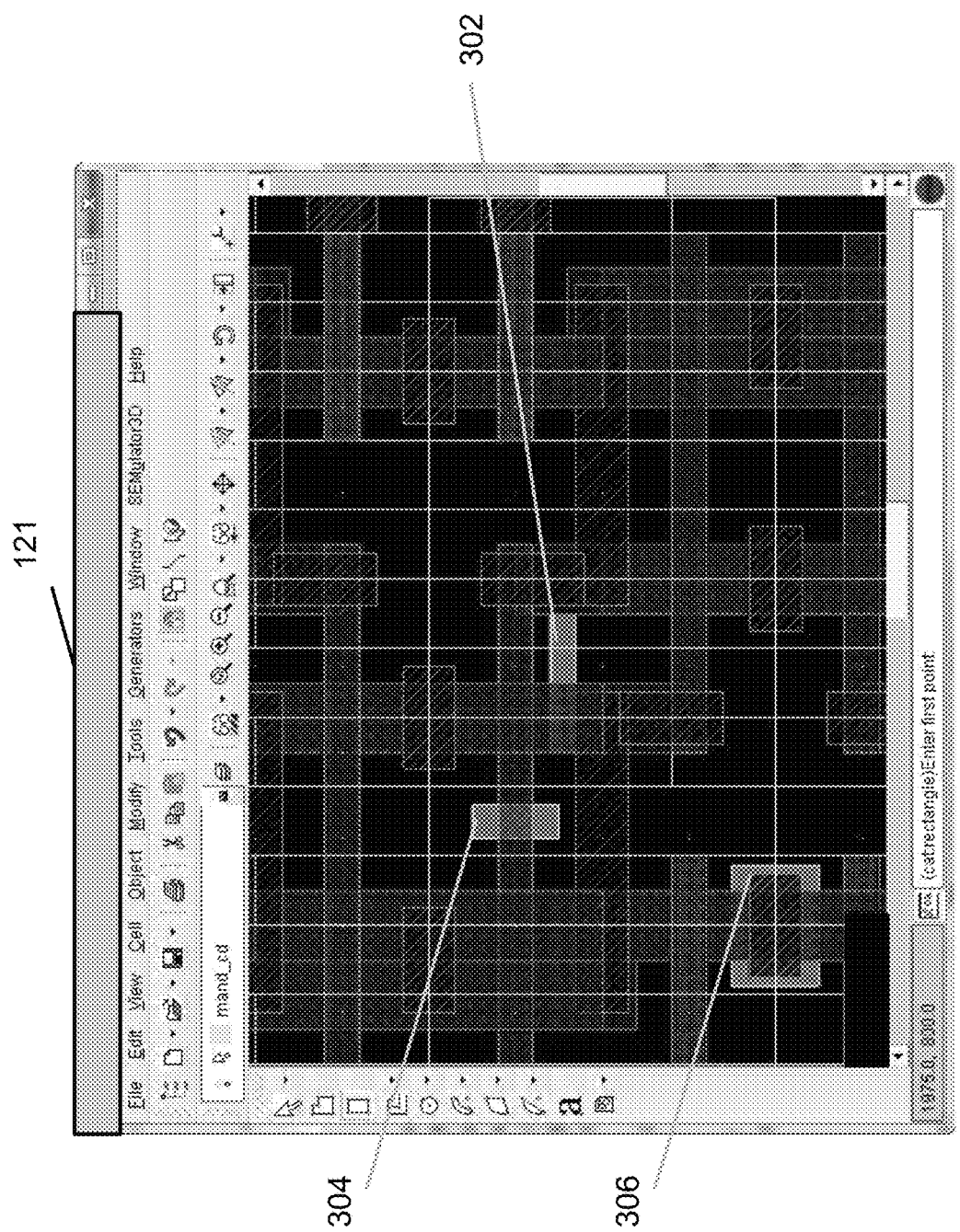
FIG. 3 depicts an exemplary layout editor in the virtual fabrication environment.

FIG. 3 depicts an exemplary layout editor in the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes may also be employed in the virtual fabrication environment. The design data is used in combination with the process data and materials database to build a 3D structural model.

Figure 4:
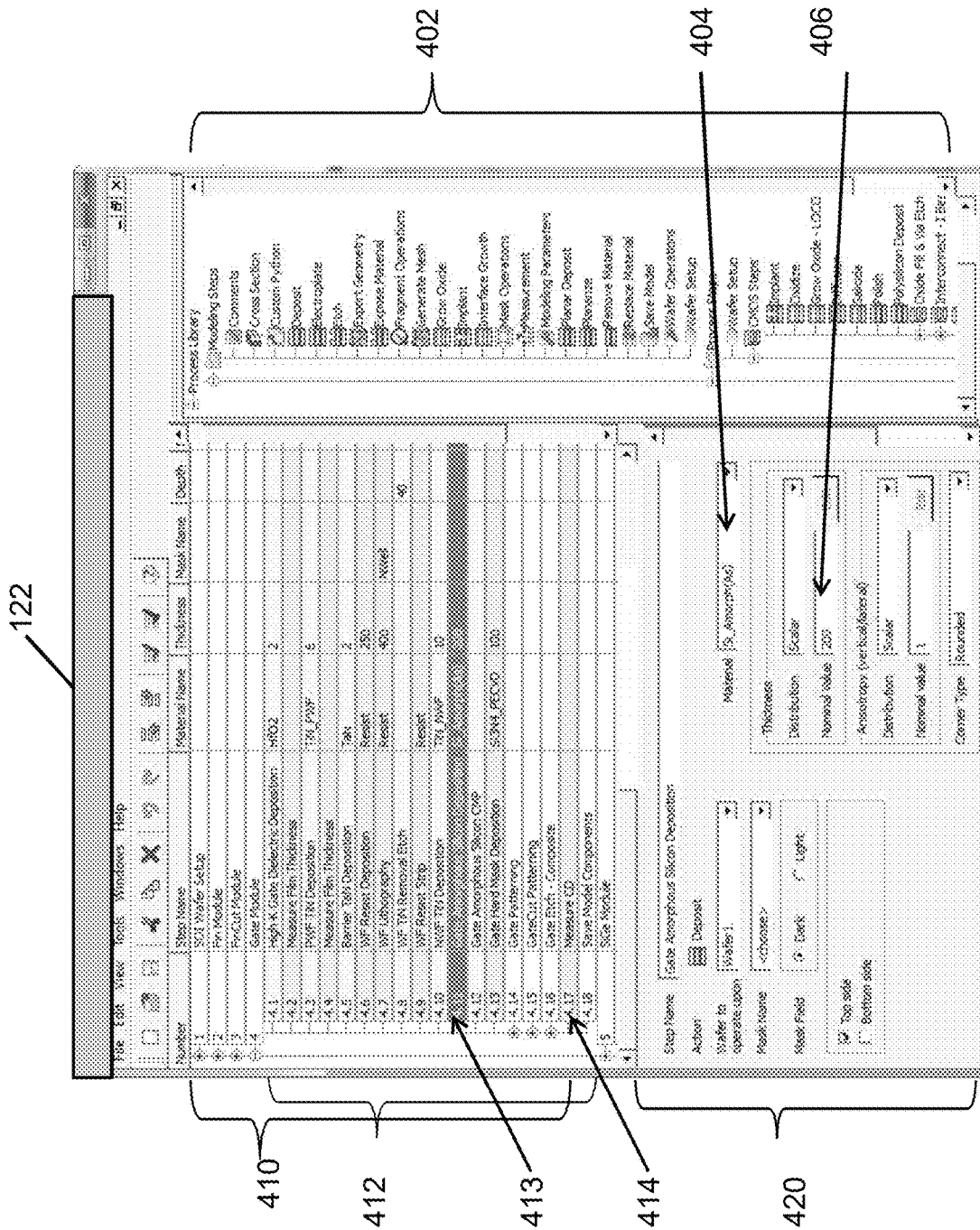
FIG. 4 depicts an exemplary process editor in the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 in the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. Inserting the virtual metrology steps directly in the fabrication sequence allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
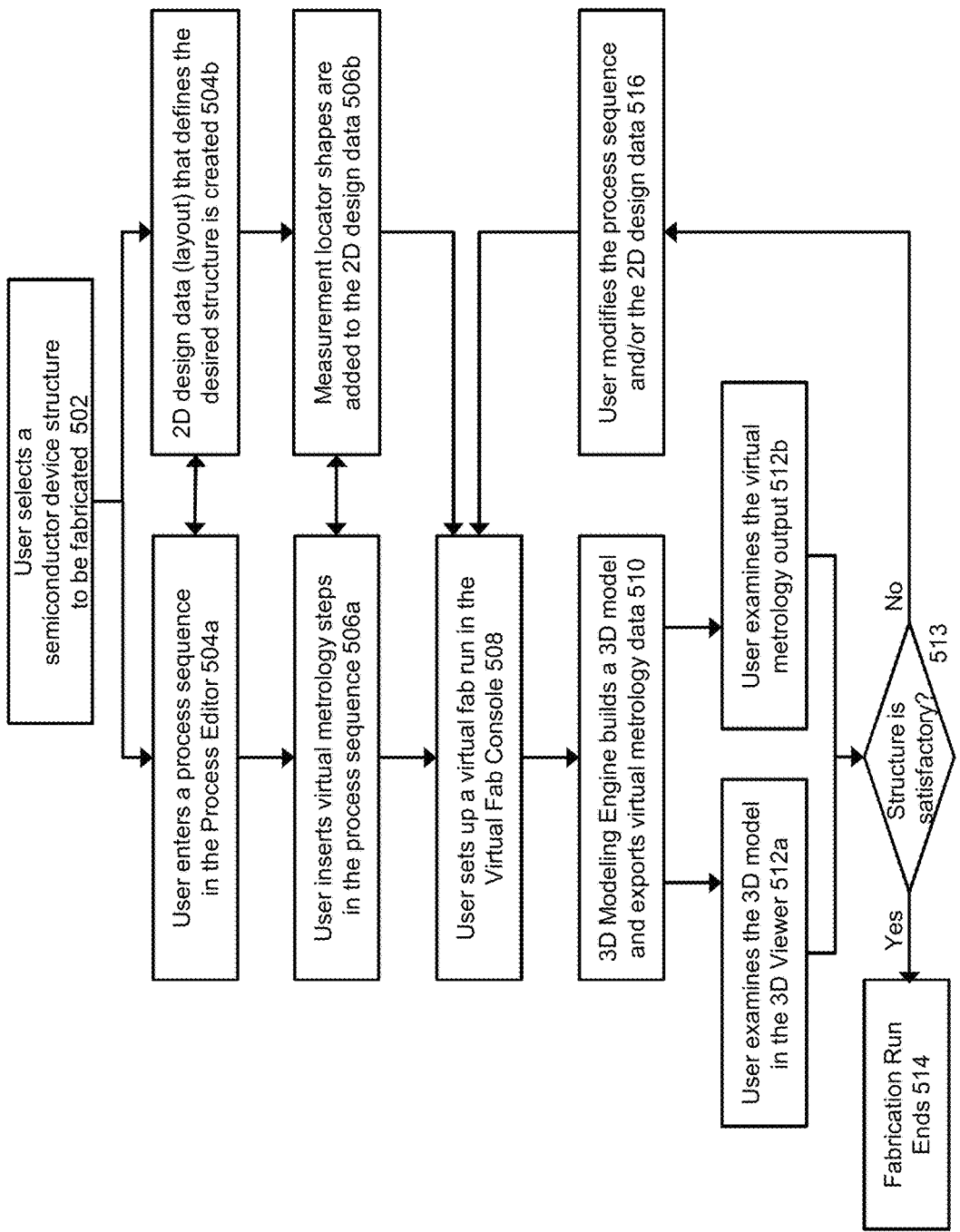
FIG. 5 depicts an exemplary sequence of steps in the virtual fabrication environment to generate virtual metrology measurement data.

FIG. 5 depicts an exemplary sequence of steps in the virtual fabrication environment to generate virtual metrology measurement data. The sequence begins with a user selecting a semiconductor device structure to be fabricated (step 502). The user may select from among multiple available sets of design data files and then select a rectangular region within the design data. For example the user may choose a FinFET or a passive resistor or a memory cell. Following the determination/selection of the structure to be fabricated, the user enters a process sequence in the process editor 122 (step 504a) and selects 2D design data that is expected to result in the desired structure (step 504*b*). Optionally, the user may create or modify design data in the layout editor 121. In the process editor, the user may insert one or more virtual metrology steps in the process sequence that specify a point during the virtual fabrication that the user would like virtual metrology measurements to be taken at specified locations in the evolving structure (step 506*a*). The user may insert locator shapes in the 2D design data displayed in the layout editor 121 that will be used by the virtual metrology step to perform its measurements (step 506*b*). The significance of a locator shape depends on the type of measurement requested. For example, the longer axis of a rectangular shape may indicate the direction and extent of a length measurement to be taken on a cross section of the structure, or the rectangle itself may designate a region where the contact area between two materials is to be measured. It will be appreciated that both above-described steps in the process editor may be performed before the steps in the layout editor or vice-versa in the virtual fabrication environment.

After the one or more locator shapes have been added to one or more layers in the 2D design data (step 506*b*) and the virtual metrology step(s) have been added to the process sequence (506*a*) the user sets up a virtual fabrication run using the virtual fabrication console 123 (step (508). During the virtual fabrication run, the process steps in the process sequence 40 are performed in the order specified by the 3D modeling engine 75. When the virtual fabrication reaches the virtual metrology step, a virtual "measurement" of the specified component in the structure being fabricated is performed. The computations done by the modeling engine depend on the nature of the measurement being requested, and are generally consistent with the analogous physical measurement technique in the fab. For example, critical dimension scanning electron microscope (CD-SEM) measurements in the fab locate sidewalls by detecting rapid changes in the orientation of the top surface of a structure. Similarly in a virtual metrology operation, the 3D modeling engine extracts the top surface of the structure in the region specified by a locator rectangle, interrogates the surface along its intersection with a plane defined by the intersection of the longer axis of the rectangle and the vertical axis for changes in slope that exceed a threshold (5 degrees, for example). Large changes in slope define faces of a feature, such as the bottom, top and sides of a ridge in the structure. Having established the locations of bottom, top and sides of a feature, the distance between the sides of the feature is computed at a vertical location (bottom, middle, or top) specified by the metrology step. The 3D modeling engine generates one or more types of output as it builds structural models. One type of output is the structural model itself, and may include its state at one or more points in the process sequence. The 3D model may be displayed to a user in the 3D viewer 125 (step 512*a*). The 3D modeling engine also exports the virtual metrology data (step 510). The virtual metrology data 80 may be exported to an automatic data analysis tool for further processing or may be displayed to a user through a user interface such as the tabular and graphical metrology results view 124 or other view (step 512*b*). If the structure when viewed or analyzed is satisfactory (step 513), the virtual fabrication run ends (step 514). If the structure created by the 3D modeling engine is unsatisfactory, the user modifies the process sequence and/or the 2D design data (step 516) and a new virtual fabrication run is set up (step 508).

Figure 6:
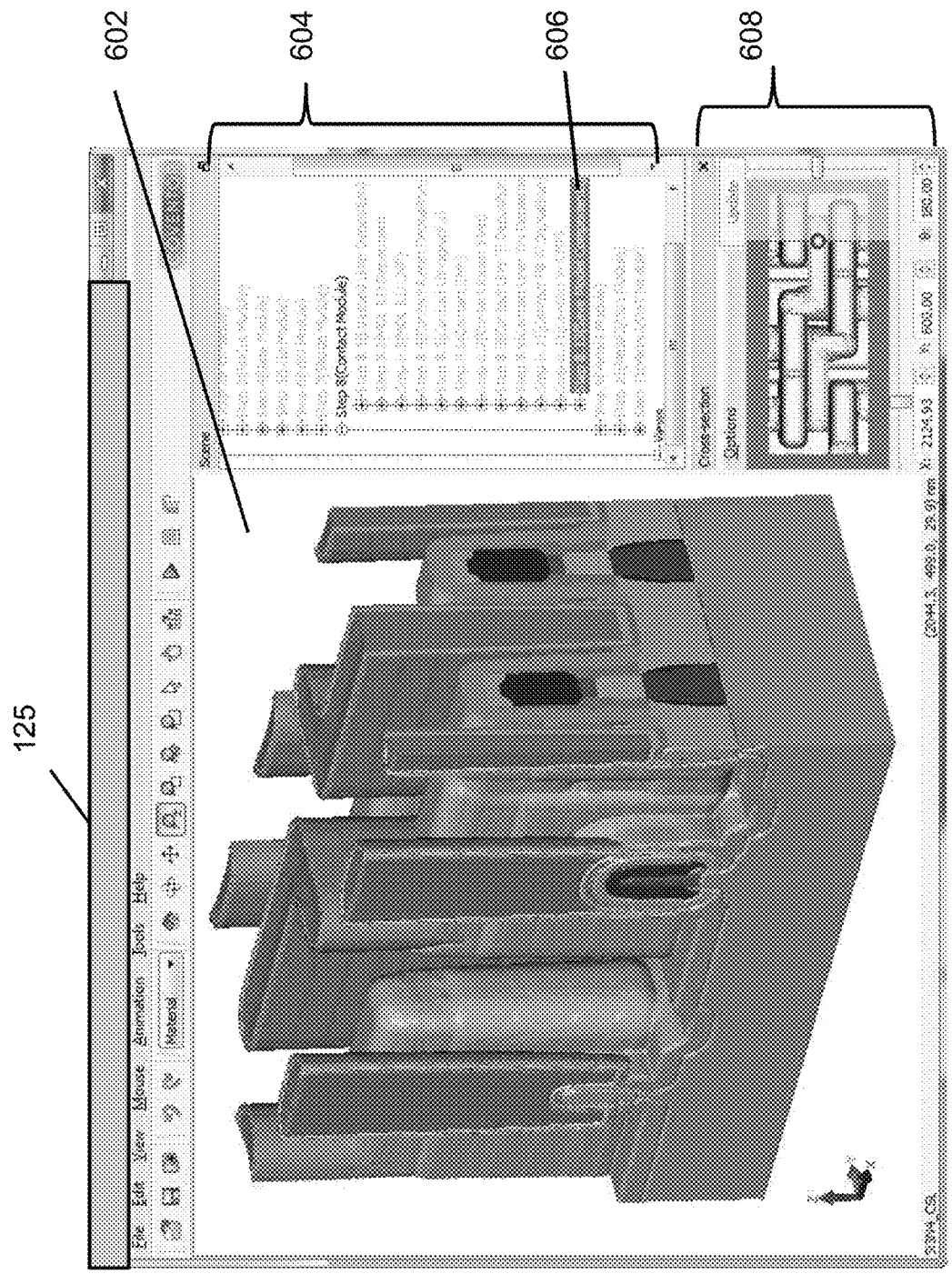
FIG. 6 depicts an exemplary 3D viewer in the virtual fabrication environment.

FIG. 6 depicts an exemplary 3D viewer 125 in the virtual fabrication environment. The 3D viewer 75 may include a 3D view canvas 602 for displaying 3D models generated by the 3D modeling engine 75. The 3D viewer 75 may display saved states 604 in the process sequence and allow a particular state to be selected 606 and appear in the 3D view canvas. The 3D Viewer provides functionality such as zoom in/out, rotation, translation, cross section, etc. Optionally, the user may activate a cross section view in the 3D view canvas 602 and manipulate the location of the cross section using a miniature top view 608.

Figure 7:
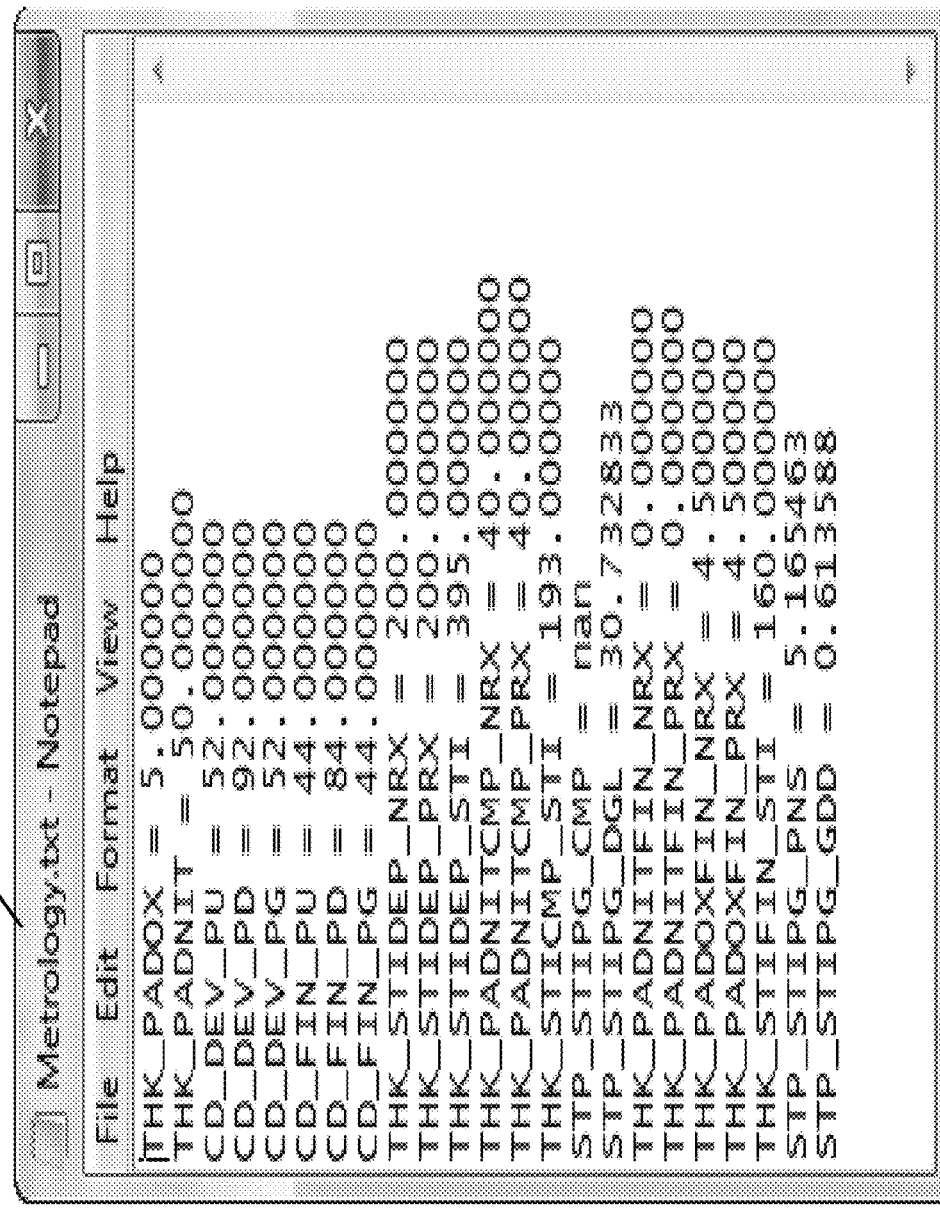
FIG. 7 depicts an exemplary display of virtual metrology measurement data in the virtual fabrication environment.

Another type of output from the 3D modeling engine 75 is the data produced by virtual metrology steps that are included in the process sequence. FIG. 7 depicts an exemplary display of virtual metrology measurement data 80 generated by multiple virtual metrology measurement steps in the virtual fabrication environment. The virtual metrology measurement result data 80 may be displayed in a tabular or graphical form including 2D X-Y plots and multi-dimensional graphics.

The techniques employed in the exemplary virtual fabrication environment are geometry-based. Calibration of the process step input parameters with actual experimental results from a physical fabrication to make virtual experiments more predictive is therefore advisable. Such calibration of the process steps results in improved modeling accuracy for all structures that comprise the full technology suite. Calibration can be executed on individual process steps from measurements, metrology or other physical characterization methods on characterization structures or product structures. Calibration may be conducted by comparing modeling results, including virtual metrology measurement data, to corresponding measurements or metrology conducted in the physical fab (on corresponding characterization or product structures), and subsequently adjusting modeling parameters such that the resulting virtually fabricated structures better match the physically fabricated structures. With proper calibration of modeling process parameters, the virtual fabrication environment becomes more predictive of the structures that result from physical fabrication throughout the entire allowed design space.

Figure 8:
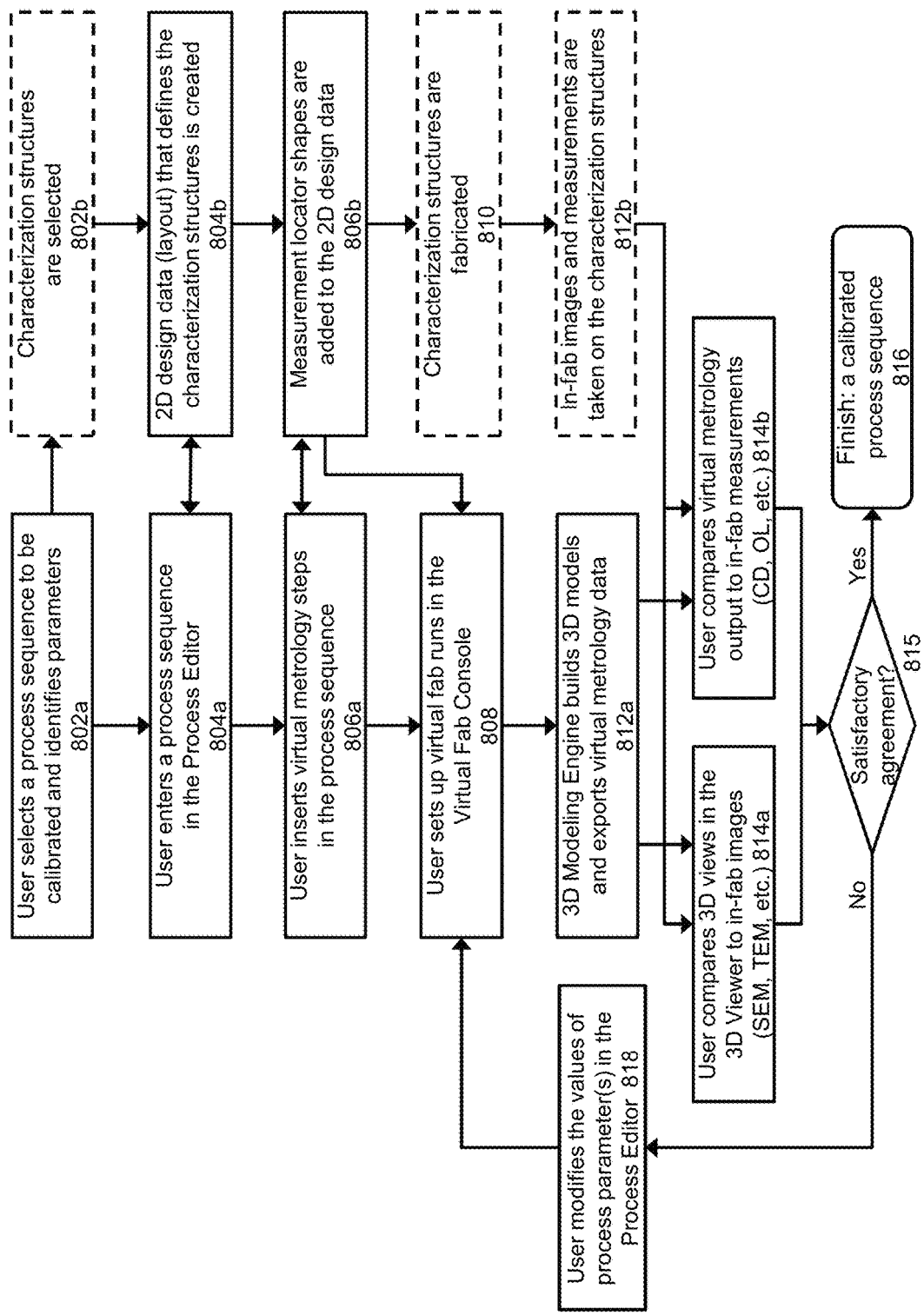
FIG. 8 depicts an exemplary sequence of steps in the virtual fabrication environment to calibrate a process sequence in a virtual fabrication environment.

FIG. 8 depicts an exemplary sequence of steps to calibrate a process sequence in a virtual fabrication environment. The sequence includes steps taken in both a virtual fabrication environment and a corresponding physical fab environment. In the virtual fabrication environment, the user selects a process sequence (for a structure to be virtually fabricated) to be calibrated and identifies related process parameters (step 802*a*). In the physical fab the user identifies a set of characterization or product structures for measurement during a fabrication run (step 802*b*). Back in the virtual fabrication environment the user enters the process sequence in the process editor (step 804*a*) and the 2D design data (layout) that defines the characterization structures is selected from available 2D design data or created for the purpose in the layout editor 121 (step 804*b*) The same design data is used for virtual fabrication and actual characterization. As discussed above, the user inserts one or more virtual metrology steps in the process sequence (step 806*a*) and adds measurement locator shapes to the 2D design data (step 806*b*). The user sets up a virtual fab run in the virtual fabrication console (step 808) and the 3D modeling engine builds the 3D model, and generates and exports virtual metrology data (step 812*a*). In parallel or offset with the virtual fabrication run, the physical fabrication environment creates the characterization or product structures (step 810) and in-fab images and measurements are taken on these structures (step 812*b*). The user may then compare the 3D views of the generated virtual model in the 3D viewer 75 to the in-fab images of the physical device structure (step 814a). Further, the set of characterization structure measurements may be compared to the virtual metrology measurements taken as a result of the virtual metrology step being inserted into the process sequence (step 814b). In most cases, this comparison will be made by the user, but alternatively the comparison may be made by an automated data analysis tool based on pre-defined or interactively solicited criteria. If there is satisfactory agreement between the views and images and the virtual and actual measurements (step 815), the process sequence is considered calibrated (step 816). However, if there is not satisfactory agreement (step 815), the user modifies the values of the process parameters in the process editor (step 818) and a new virtual fabrication run is set up in the virtual fabrication console (step 808). The sequence then iterates until a satisfactory agreement is reached and calibration is achieved.

It should be appreciated that there may be a number of different parameters that may be calibrated within the sequence. Although the above description notes the use of the insertion of virtual metrology steps in the process sequence and the related use of the 2D locator shape or shapes to conduct the virtual metrology measurements, other techniques could be employed in the in a virtual fabrication environment. For example, the virtual measurements could be conducted on a virtual device structure after fabrication is completed and then compared to the physical measurements taken of the characterization structures during/after the physical fabrication run.

While building a single structural model can be valuable, there is increased value in virtual fabrication that builds a large number of models. A virtual fabrication environment may enable a user to create and run a virtual experiment. In a virtual experiment, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability may be used to mimic two fundamental types of experiments that are typically performed in the physical fab environment. Firstly, fabrication processes vary naturally in a stochastic (non-deterministic) fashion. As explained herein, a fundamentally deterministic approach used for each virtual fabrication run nevertheless can predict non-deterministic results by conducting multiple runs. A virtual experiment mode allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment in the virtual fabrication environment can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 9:
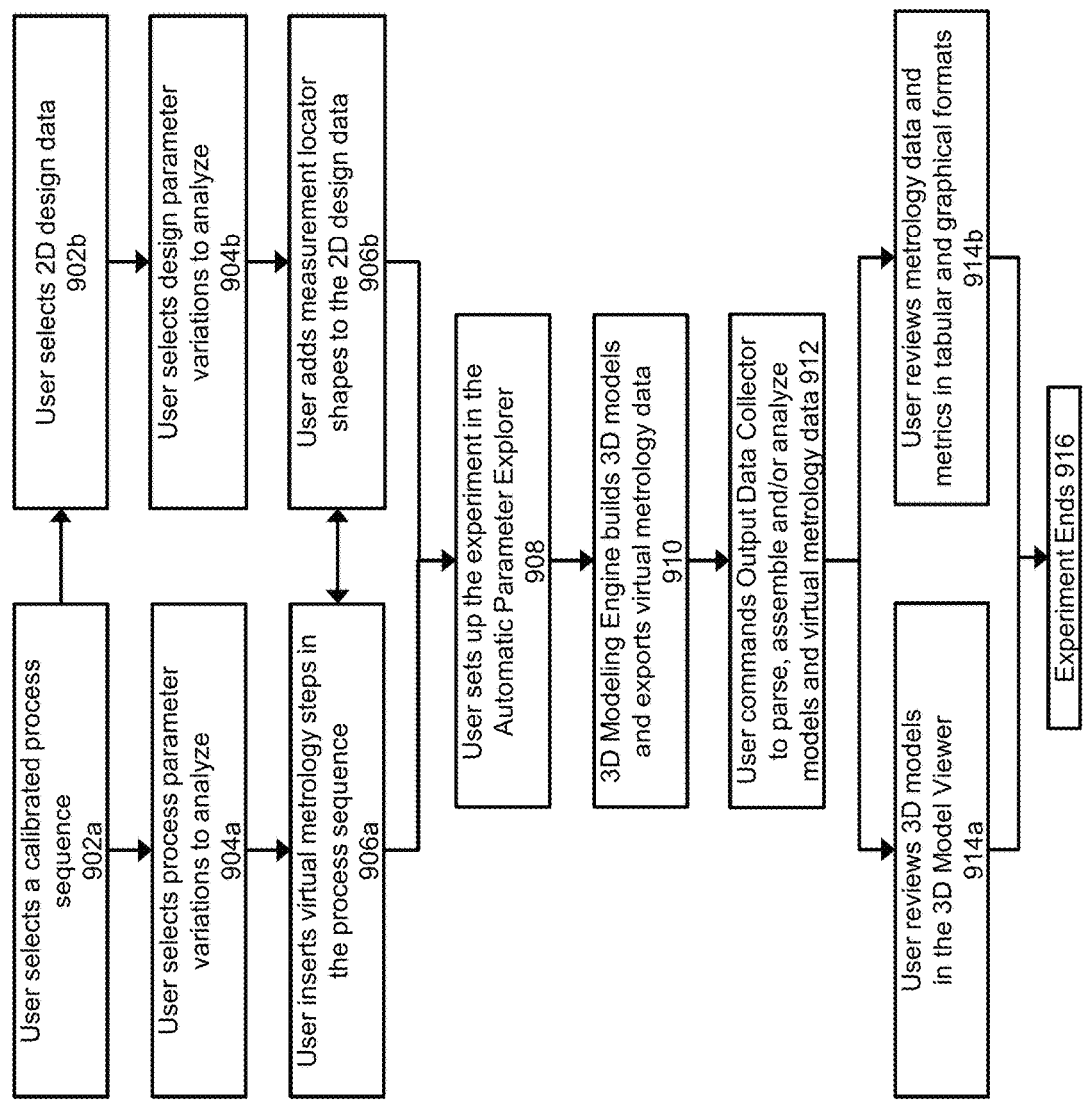
FIG. 9 depicts an exemplary sequence of steps to set up and perform a virtual experiment generating virtual metrology measurement data for multiple semiconductor device structure models in the virtual fabrication environment.
Figure 10:
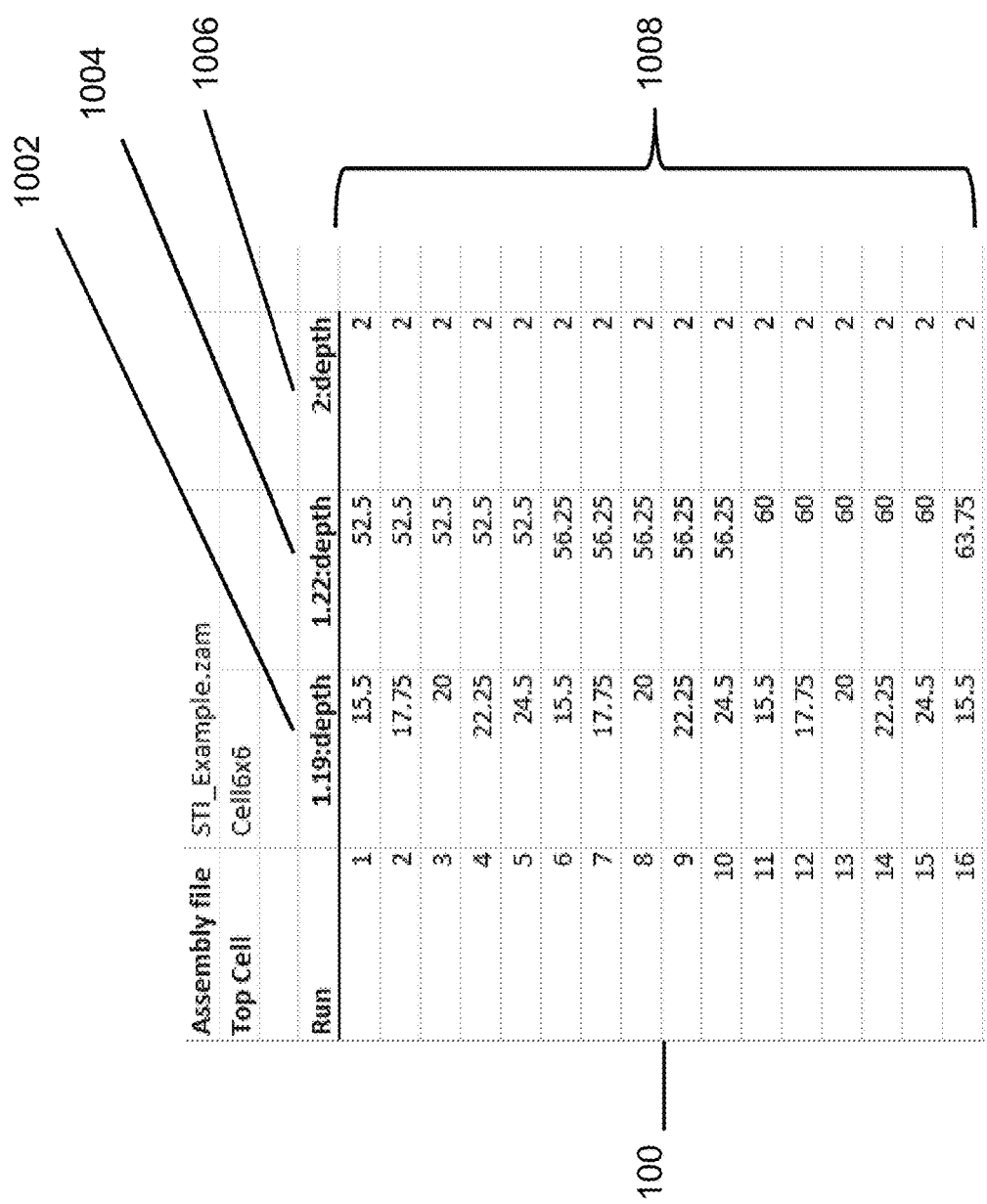
FIG. 10 depicts an exemplary parameter explorer view used to provide process parameters for a virtual experiment in the virtual fabrication environment.

FIG. 9 depicts an exemplary sequence of steps in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 902a) and identifying/creating 2D design data (step 902b). The user may select process parameter variations to analyze (step 904a) and/or design parameter variations to analyze (step 904b). The user inserts one or more virtual metrology steps in the process sequence as set forth above (step 906a) and adds measurement locator shapes to the 2D design data (step 906b). The user may set up the virtual experiment with the aid of a specialized user interface, an automatic parameter explorer 126 (step 908). An exemplary automatic parameter explorer is depicted in FIG. 10 and may display, and allow the user to vary, the process parameters to be varied 1002, 1004, 1006 and the list of 3D models to be built with their corresponding different parameter values 1008. The parameter ranges for a virtual experiment can be specified in a tabular format. The 3D modeling engine 75 builds the 3D models and exports the virtual metrology measurement data for review (step 910). The virtual experiment mode provides output data handling from all Virtual Measurement/Metrology operations. The output data from the virtual metrology measurements may be parsed and assembled into a useful form (step 912).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 11 depicts an exemplary tabular-formatted display of virtual metrology data generated by a virtual experiment in the virtual fabrication environment. In the tabular formatted display, the virtual metrology data collected during the virtual experiment 1102 and the list of virtual fabrication runs 1104 may be displayed.

Figure 12:
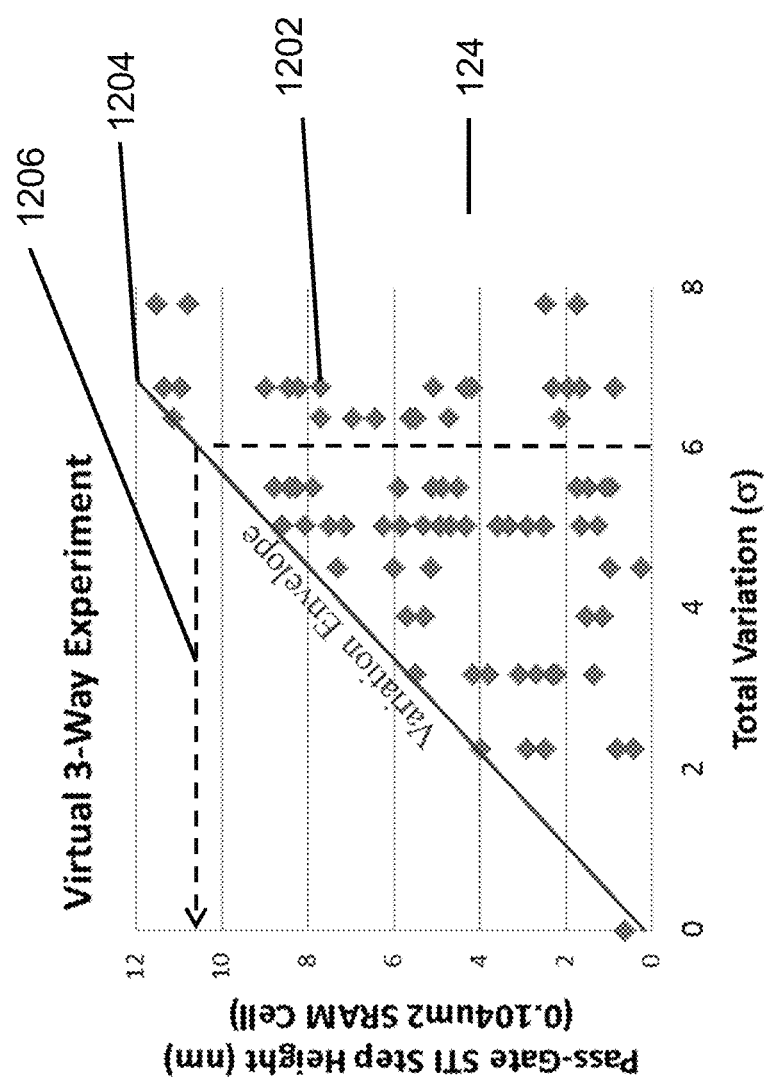
FIG. 12 depicts an exemplary graphical display of virtual metrology data generated in a virtual experiment in the virtual fabrication environment.

FIG. 12 depicts an exemplary 2D X-Y graphical plot display of virtual metrology data generated by a virtual experiment in the virtual fabrication environment. In the example depicted in FIG. 10, the total variation in shallow trench isolation (STI) step height due to varying 3 parameters in preceding steps of the process sequence is shown. Each diamond 1202 represents a virtual fabrication run. The variation envelope 1204 is also displayed as is the depicted conclusion 1206 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 914*a*) and review the virtual metrology measurement data and metrics presented for each virtual fabrication run (step 914*b*). Depending on the purpose of the virtual experiment, the user can analyze the output from the 3D modeling engine for purposes of developing a process sequence that achieves a desired nominal structural model, for further calibrating process step input parameters, or for optimizing a process sequence to achieve a desired process window.

The 3D modeling engine's 75 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 uses multiple cores and/or processors to perform individual modeling steps. In addition, the structural models for different parameter values in a set are completely independent and can therefore be built in parallel using multiple cores, multiple processors, or multiple systems.

The 3D modeling engine 75 in the virtual fabrication environment may represent the underlying structural model in the form of voxels. Voxels are essentially 3D pixels. Each voxel is a cube of the same size, and may contain one or more materials, or no materials. Those skilled in the art will recognize that the 3D modeling engine 75 may also represent the structural model in other formats. For instance, the 3D modeling engine could use a conventional NURBS-based solid modeling kernel such as is used in 3D mechanical CAD tools, although modeling operations based on a digital voxel representation are far more robust than the corresponding operations in a conventional analog solid modeling kernel. Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

The virtual fabrication environment may enable the performance of a multi-etch process that is included in the process sequence which allows the 3D modeling engine 75 to model a wide-range of process and material-specific etch behavior. Patterning operations in process flows for highly scaled semiconductor devices are frequently performed using plasma etches. Plasma etches are known by many different names: dry etch, reactive ion etch (RIE), inductively coupled plasma (ICP) etch, etc. A wide variety of operating conditions and chemistry allows process engineers to fine-tune plasma etch behavior to selectively achieve diverse etch physics in multiple different classes of materials. This behavioral flexibility is key to achieving a desired 3D structure when patterning through several layers of material. Several different types of physics are typically involved, including but not limited to: chemical etching, sputtering, deposition or re-deposition of polymeric material, electrostatic charging, electrostatic focusing, and shadowing. This diverse spectrum of physics produces a commensurate range of etch behavior and hence structural shapes.

Directly simulating the physics involved in plasma etches with sufficient accuracy is extremely difficult and slow. The multi-etch process step avoids the difficulties of physics-based simulations by simulating plasma etches using a reduced set of behavioral parameters that are specific to the type of etch and the material being etched. This allows the capture of a wide range of physical etch behavior without the need to directly simulate the physics of the etch process. For example, three main types of etch behavior may be simulated: isotropic, taper, and sputtering. A fourth type of etch behavior, shadowing, can optionally also be simulated.

Basic (isotropic) behavior is caused (physically) by chemical etching and results in material being removed at a similar rate in all directions from the point on the etchable surface, regardless of the local orientation of the etchable surface. Basic behavior may be modeled with a single input parameter, "lateral ratio", that controls the ratio between the lateral and vertical etch rates. For example, a lateral ratio value of one (1.0) indicates that the etch rate is uniform in all directions. A lateral ratio value less than one indicates that the etch rate in the lateral direction (on vertical surfaces) is slower than the etch rate in the vertical direction (on horizontal surfaces).

Taper behavior is caused (physically) by a combination of directional etch behavior and polymer deposition. The polymer deposition occurs as a side effect of a directional etch process. During a directional etch process that etches horizontal surfaces much faster than vertical surfaces, polymer may accumulate on near-vertical surfaces. This competition between etching and deposition results in tapered sidewall profiles. Taper behavior may be modeled with a single input parameter, the taper angle. A taper angle describes the critical angle at which deposition and etch rates are balanced. An optional second parameter, the lateral ratio, has the same meaning as defined above for basic behavior.

Sputter behavior refers to direct physical removal of material through bombardment by energetic ions and results in preferential removal of protruding edges (convex edges) and in some cases corners. Sputtering may be modeled with two parameters: the angle of maximum sputter yield, and the rate of sputter relative to the rate of vertical etching.

Shadowing refers to a reduction in directional ion flux caused by a local elevation change, effectively reducing etch rates for some structures. This effect can be significant in some cases, resulting in differing etch rates across a cell. Shadowing may be modeled using a single parameter to describe angle of incidence of the energetic ions relative to a vertical axis.

To model a multi-material, multi-physics etch, the input parameters described above must be formed into a suitable numerical modeling algorithm in the virtual fabrication environment. The numerical modeling algorithm includes single material and multi-material speed functions and a surface evolution technique. A single-material speed function defines the etch speed as a function of local surface orientation (i.e., surface normal direction) and is determined empirically in order to produce the desired etch behavior. Note also that a single-material speed function may combine multiple types of etch behavior; for example, both taper and sputter etching include the parameters associated with basic (isotropic) etching. A multi-material speed function is a combination of single-material speed functions, and calculates the local etch speed as a function of both local surface orientation and local material type. The Etch Ratio parameter defines the relative etch rates of etchable materials and is a multiplication factor on the single-material speed.

With the speed function defined, a suitable surface evolution technique may be used to locate and evolve the position of the etchable surface in three dimensions. The etchable surface is advected or moved in its local normal direction according to the local scalar speed determined by evaluating the speed function. The scalar speed must be calculated at points of interest on the etchable surface and must be periodically re-calculated as the geometry of the etchable surface evolves.

A number of different types of surface evolution techniques may be utilized by the numerical algorithm for simulating the multi-etch process in the virtual fabrication environment. The moving surface may be represented using any suitable numerical spatial discretization. Explicit front tracking methods may be used: examples include string methods, point-and-line methods (2D) and polygon surfaces (3D). An alternate implicit surface representation, such as distance fields, volume of fluid or voxels, may also be used. Any suitable time-dependent numerical technique may be used to advance the moving surface in time.

It will be appreciated that the virtual fabrication environment may also support a number of other techniques in addition to those described above that are needed to virtually fabricate semiconductor device structures including, but not limited to, the simulation of selective epitaxy steps and the ability to perform 3D Design Rule Checks.

Defect Mitigation and Parameter Space Exploration for EUV Lithography

As mentioned above, EUV lithography uses light of a much shorter wavelength (13.5 nanometers) versus previous traditional lithography approaches that utilized light of a longer wavelength (193 nm). However this shorter wavelength light is harder to guide during projection and is readily absorbed. Because the pattern fidelity in the exposed photoresist depends on the material modification of finite-sized molecules in the photoresist as a result of the exposure to EUV energy, there is some random variation in the resulting pattern. In advanced semiconductor technologies, desired critical dimensions are approaching the dimension of these finite-sized photoresist molecules. As a result, these stochastic variations are significant and problematic for patterning yield. For example, due to the stochastic nature of an EUV lithography exposure, several defects can arise in the developed image in resist during fabrication. Among these defects, notches in a resist line can form that can open completely during the underlayer or hard mask etch step and these notches may ultimately lead to line breaks. Also, a remaining residue or "scum" between the resist features that remains after the development phase of lithography can lead to bridging lines after the etch process.

Figure 13:
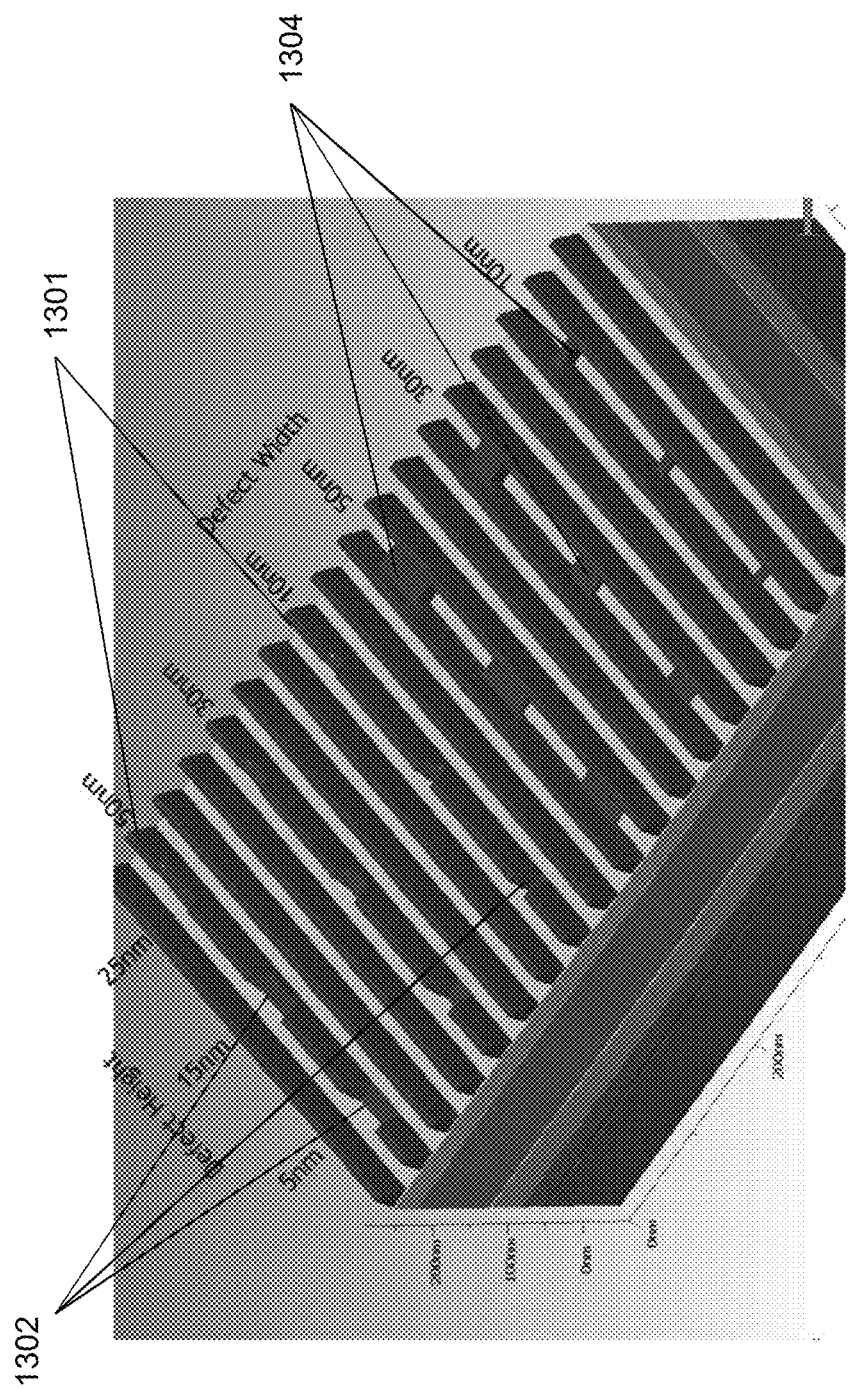
FIG. 13 depicts an exemplary 3D view in the virtual fabrication environment of resist line notching and bridging defects resulting from EUV lithography in an exemplary embodiment.

FIG. 13 depicts an exemplary 3D view in a virtual fabrication environment of a 3D model containing resist line notching and bridging defects resulting from EUV lithography in an exemplary embodiment. The pictured resist includes notch defects 1302 in the resist lines 1301. The 3D model also depicts bridging lines 1304 caused by excessive scum accumulation between resist lines. These unwanted notches and scum accumulation may be addressed with atomic layer deposition (ALD) and atomic layer etch (ALE) processes performed cyclically within an etch chamber without removing the wafer.

In more detail, one solution to address these notching and bridging issues is to use a descum process consisting of an ALE reduction of scum height followed by a protective deposition on the resist and the performance of ALE to continue removing resist residue while simultaneously controlling the critical dimension (CD) of the desired features. However, the number and range of the process parameters in each of these three steps can be exorbitantly large. For example, varying aspect ratio dependence, deposition and etch times, cycle count, material selectivity, etc. can lead to unmanageably large virtual experiments/Design of Experiments (DOEs) where an optimized solution may not be found even with engineering intuition. Additionally, given the randomness of defects and metrology difficulties, it is extremely difficult if not impossible to determine and study the worst-case scenarios where scum height is larger than divot height and defect size approaches printed feature size for any given DOE leg. Metrology is unable to perform enough sampling to capture the full range of defects, particularly in photoresist.

Embodiments augment the parameter space optimization abilities provided by a virtual fabrication environment to find the limits of the etch-deposition defect mitigation flow described above. In one embodiment, the virtual fabrication environment described herein includes instructions in a defect mitigation module 77 enabling the creation of a 3D model of an IC or other semiconductor device of interest from a physical design pattern (identifying mask shapes) to model defects (both scum and notches) of varying height and width that covers a full range of possible incoming defects resulting from the lithography development and exposure process. Experimental and measured results from a physical fab and/or simulations are used to model resist profiles and material selectivities. Material selectivity is a parameter in semiconductor fabrication that considers both the masking material and the substrate material and is defined as the ratio of the etch rates of the substrate material to the masking material. Material selectivities are associated with the particular materials in the structure being fabricated (e.g.: oxide may etch more easily than nitride in a given etch step). Resist profiles (undercut, overcut or vertical) identify the effect of various lithography exposure and development conditions on the shape of resist side walls. Other geometric parameters for the process sequence that can be experimentally controlled such as deposition thickness, etch depths, aspect ratio dependence, lateral to vertical ratios, etc. can be systematically changed during a DOE in the virtual fabrication environment. The virtual fabrication environment allows DOE simulations (virtual experiments) to be performed without concern for engineering time or material and equipment usage. Simulation outputs can then be analyzed for defect quantities, and scum-to-divot and defect-to-printed features can be determined for the simulated process. These simulated results and input parameters can then be used as center points for actual experimental application on the actual process equipment. Additionally, other EUV stochastic-related, yield-impacting patterning characteristics can be examined using these simulations.

This approach of using material selectivities and resist profiles identified from a physical fab and/or simulations to perform DOEs run in the virtual fabrication environment to simulate defect mitigation enables faster speed to solution by reducing the range of parameters adjusted to find the optimal solution for defect mitigation. It also provides quantitative targets for upstream lithography processes without requiring a trial and error approach of determining breaking point, enabling a process control methodology with the scanner to minimize final defectivity. i.e.—the scanner optical model can be used to find the maximum defect size, and the embodiments are able to identify what defects are allowable by subsequent processing.

Figure 14:
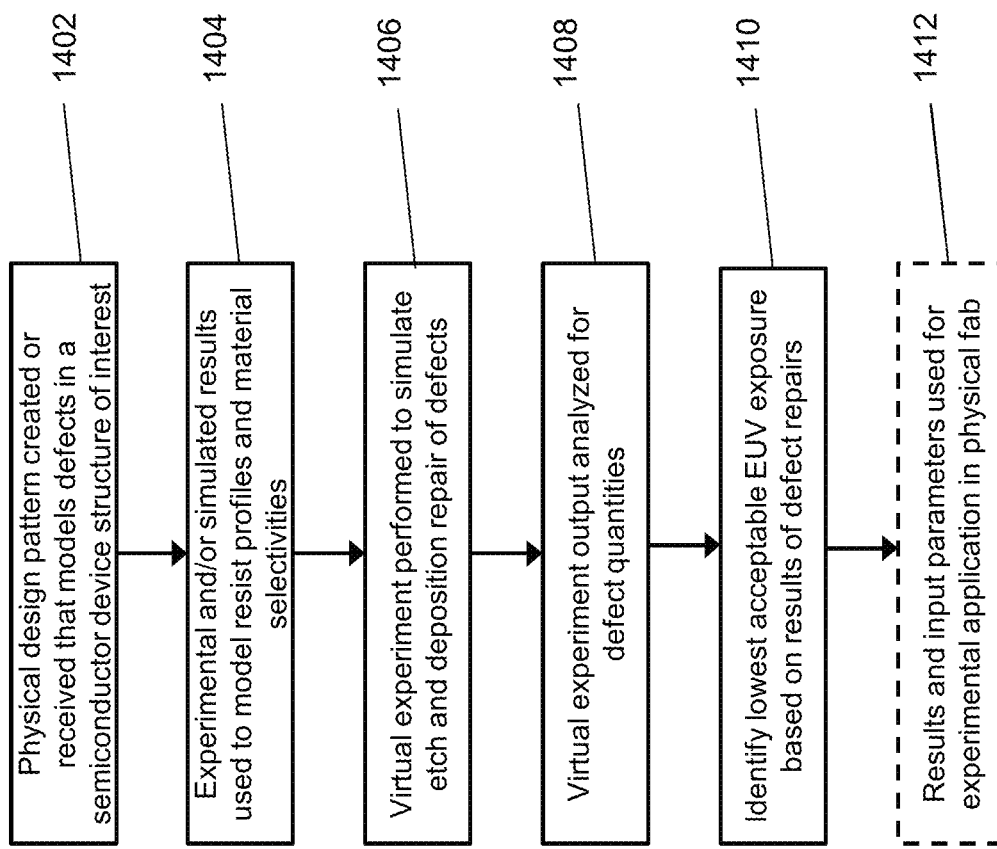
FIG. 14 depicts an exemplary sequence of steps performed in the virtual fabrication environment to determine a range of repairable defects and optimize an EUV lithography-based fabrication in an exemplary embodiment.

FIG. 14 depicts an exemplary sequence of steps performed in the virtual fabrication environment to determine a range of repairable defects and optimize an EUV lithography-based fabrication in an exemplary embodiment. A physical design pattern is created or received in the virtual fabrication environment that models defects in a semiconductor device structure of interest (step 1402). Experimental and measured results from a physical fab and/or simulations are used to model resist profiles and material selectivities (step 1404) and multiple 3D models of a semiconductor structure of interest are generated pursuant to a virtual experiment (Design of Experiment) using the physical design pattern and material selectivity and resist profile information with varying input parameters to simulate etch and deposition repair of defects (step 1406). The varying parameters in the virtual experiment may include ranges of deposition thickness, etch depths, aspect ratio dependence and lateral to vertical ratios. The parameters may be selected by a user of the virtual fabrication environment via a graphical user interface or may be programmatically selected by the defect mitigation module. The virtual experiment output is analyzed to determine remaining defect quantities in each of the 3D models after the etch and deposition repair operations have been performed (step 1408). Based on the results, a lowest acceptable EUV lithography exposure dose or dose range may be identified based on which 3D models have an acceptable quantity of defects following the repair operations (step 1410). The lowest acceptable exposure dose may be determined programmatically (using statistical analysis), and depends on the specific thresholds for multiple different defect types. By identifying, a lowest acceptable EUV lithography exposure dose or dose range which results in an acceptable amount of defects after repair, fabrication time may be minimized resulting in a lower cost per wafer Additionally, the results and input parameters from the virtual experiment may optionally also be used to conduct more targeted experiments in a physical fab (step 1412).

Line Edge Roughness

In addition to stochastic-related defects generated during EUV lithographic patterning, line edge roughness in resist lines arises from the random variation inherent in EUV lithography exposure and remains a critical issue in fine pitch patterning. Like scum and divot defects, line edge roughness is also largely dependent on exposure dose, and achieving the defined specification for roughness at a lower exposure dose can greatly reduce the cost of manufacturing. Embodiments enable a virtual fabrication environment to model the deposition-etch process to smooth resist lines during the defect mitigation process. For example, improvements in resist line edge roughness and local CDU that are also improved by the ALD/ALE methodology can also be modeled in the virtual fabrication environment and jointly co-optimized. Deposition and Etch processes can modify the materials on surfaces in the 3D structure, resulting in smoother (or rougher) edges. The deposition-etch repair process can greatly reduce mid to high frequency resist roughness (the frequency of LER refers to the length of oscillations of the surface. High frequency LER appears as very fine roughness, whereas low frequency LER appears as longer waviness of line edges) and can be tuned using several factors including deposition and etch rates, aspect ratio dependence, number of cycles, and isotropy. Additionally, finite element method approaches can be used to analyze necessary film parameters like film stress and modulus that can reduce low frequency roughness by mechanical force interactions. Resulting images can then be analyzed using standard line edge roughness software tools to remove LER noise from metrology images. Like the defect mitigation strategy discussed above, this line edge roughness modeling can also be combined with lithography modeling to determine the minimum required lithography exposure dose or dose range that can be corrected by deposition and etch processes. Since line edge roughness is affected by exposure dose, identifying a lower exposure dose that produces line edge roughness that is repairable by deposition and etch processes is a significant benefit since operating at a lower dose during exposure reduces lithography throughput time and therefore fabrication cost.

FIG. 15 depicts an exemplary sequence of steps performed in the virtual fabrication environment to reduce line edge roughness in an exemplary embodiment The simulation flow includes the generation of resist profiles and stack profiles (step 1502) and the meshing of the 3D model in the virtual fabrication environment (step 1504). The mesh can optionally be provided to separate finite element analysis software (step 1506) to analyze necessary film parameters like film stress and modulus that can reduce low frequency roughness by mechanical force interactions. Appropriate mechanical properties of the materials, boundary conditions, and forces arising from film stresses can be applied to the geometric model, and numerical solutions for force and displacement can be calculated by the finite element analysis software (step 1508). The new geometries generated by the stress simulations can then be imported back to the virtual fabrication environment (step 1510) and used to simulate subsequent deposition and etch operations to perform line edge roughness repair during the virtual experiment (step 1512). It should be appreciated that the use of separate finite element analysis is optional and the above-described sequence could proceed directly from step 1504 to step 1512. The final results of line edge roughness following the deposition and etch repair operations can be converted to images amenable to line edge roughness analysis software such as a grayscale image (step 1514), and then provided to line edge roughness software where virtual Critical Dimension-Scanning Electron Microscope (CD-SEM) type results (measuring the dimensions of patterns) can be generated (step 1516) to determine the smoothness status of the resist lines for each of the 3D models. Results may be presented via the virtual fabrication environment. Based on which 3D models show that the line edge roughness has been adequately repaired/meets a pre-determined smoothness threshold, a lowest acceptable EUV exposure dose or dose range may be identified by the virtual fabrication environment.

Although the description herein has focused on EUV lithography exposure simulated by the virtual fabrication environment, it should be appreciated that embodiments of the present invention are not so limited. In some embodiments, the techniques described herein for defect mitigation and line edge roughness repair may be applied to identify a lowest acceptable lithography exposure dose of other (non-EUV) types of lithography exposure where the defects or line edge roughness are repairable to a satisfactory level.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory computer-readable medium holding computer-executable instructions for performing defect mitigation caused by lithography exposure in a virtual semiconductor fabrication environment, the instructions when executed causing the computing device to:
   receive or create a physical design pattern in a virtual fabrication environment to model defects from lithography exposure during fabrication of a semiconductor device structure;
   receive in a virtual fabrication environment material selectivity and resist profile information for use in virtual fabrication of a 3D model of the semiconductor device structure;
   perform in the virtual fabrication environment a virtual experiment performing a plurality of virtual fabrication runs using the physical design pattern and material selectivity and resist profile information, the virtual experiment creating a plurality of 3D models of the semiconductor device structure and performing a plurality of deposition and etching operations on one or more defects in the plurality of 3D models using one or more experimentally-controlled parameters;
   determine a remaining defect quantity for each of the plurality of 3D models created by the virtual experiment following the performing of the plurality of deposition and etching operations; and
   identify, based on the remaining defect quantity for each of the plurality of 3D models created by the virtual experiment, a lowest lithography exposure dose or dose range at which the one or more defects are repairable by the plurality of deposition and etching operations.

2. The medium of claim 1 wherein the one or more defects include one or more of a notch in a resist line or an excessive residue between resist features.

3. The medium of claim 1 wherein the instructions when executed further cause the computing device to:
   receive via a graphical user interface in the virtual fabrication environment one or more selections of the one or more experimentally-controlled parameters for the plurality of deposition and etching operations on one or more defects in the 3D model.

4. The medium of claim 1 wherein the one or more experimentally-controlled parameters include at least one of a deposition thickness, an etch depth, an aspect ratio dependence or a lateral to vertical ratio.

5. The medium of claim 1, wherein the instructions when executed further cause the computing device to:
   perform in the virtual fabrication environment a plurality of deposition and etching operations on one or more rough resist lines in each of the plurality of 3D models created by the virtual experiment;
   determine a smoothness status of the one or more rough lines based on results of the performing of the plurality of deposition and etching operations on the one or more rough resist lines; and
   identify, based on the smoothness status of the one or more rough lines, a lowest lithography exposure dose or dose range at which the one or more rough lines meet a pre-determined smoothness threshold and the one or more defects are repairable.

6. The medium of claim 5 wherein the instructions when executed further cause the computing device to:
   receive via a graphical user interface in the virtual fabrication environment one or more selections of parameters for the plurality of deposition and etching operations on the one or more rough resist lines in the 3D model.

7. The medium of claim 6 wherein the one or more selections include one or more of a deposition rate, an etch rate, an aspect ratio dependence, a number of cycles or an isotropy parameter.

8. The medium of claim 1 wherein the lithography exposure is Extreme Ultraviolet Lithography (EUV) exposure.

9. A computing device-implemented method for performing defect mitigation caused by lithography exposure in a virtual semiconductor fabrication environment, the computing device including one or more processors, the method comprising:
   receiving or creating a physical design pattern in a virtual fabrication environment to model defects from lithography exposure during fabrication of a semiconductor device structure;

receiving in a virtual fabrication environment material selectivity and resist profile information for use in virtual fabrication of a 3D model of the semiconductor device structure;

performing in the virtual fabrication environment a virtual experiment performing a plurality of virtual fabrication runs using the physical design pattern and material selectivity and resist profile information, the virtual experiment creating a plurality of 3D models of the semiconductor device structure and performing a plurality of deposition and etching operations on one or more defects in the plurality of 3D models using one or more experimentally-controlled parameters;

determining a remaining defect quantity for each of the plurality of 3D models created by the virtual experiment following the performing of the plurality of deposition and etching operations; and identifying, based on the remaining defect quantity for each of the plurality of 3D models created by the virtual experiment, a lowest lithography exposure dose or dose range at which the one or more defects are repairable by the plurality of deposition and etching operations.

10. The method of claim 9 wherein the one or more defects include one or more of a notch in a resist line or an excessive residue between resist features.

11. The method of claim 9, further comprising:
receiving, via a graphical user interface in the virtual fabrication environment, one or more selections of the one or more experimentally-controlled parameters for the plurality of deposition and etching operations on one or more defects in the 3D model.

12. The method of claim 9 wherein the one or more selections include at least one of a deposition thickness, an etch depth, an aspect ratio dependence or a lateral to vertical ratio.

13. The method of claim 9, further comprising:
performing in the virtual fabrication environment a plurality of deposition and etching operations on one or more rough resist lines in the 3D model;
determining a smoothness status of the one or more rough lines based on results of the performing of the plurality of deposition and etching operations on the one or more rough resist lines; and
identifying, based on the smoothness status of the one or more rough lines, a lowest lithography exposure dose or dose range at which the one or more rough lines meet a pre-determined smoothness threshold and the one or more defects are repairable.

14. The method of claim 13, further comprising:
receiving, via a graphical user interface in the virtual fabrication environment, one or more selections of parameters for the plurality of deposition and etching operations on the one or more rough resist lines in the 3D model.

15. The method of claim 14 wherein the one or more selections include one or more of a deposition rate, an etch rate, an aspect ratio dependence, a number of cycles or an isotropy parameter.

16. The medium of claim 9 wherein the lithography exposure is Extreme Ultraviolet Lithography (EUV) exposure.

17. A virtual fabrication system, comprising:
at least one computing device equipped with one or more processors and configured to generate a virtual fabrication environment that includes a defect mitigation module, the defect mitigation module when executing:

receives or creates a physical design pattern in a virtual fabrication environment to model defects from lithography exposure during fabrication of a semiconductor device structure;

receives in a virtual fabrication environment material selectivity and resist profile information for use in virtual fabrication of a 3D model of the semiconductor device structure;

performs in the virtual fabrication environment a virtual experiment performing a plurality of virtual fabrication runs using the physical design pattern and material selectivity and resist profile information, the virtual experiment creating a plurality of 3D models of the semiconductor device structure and performing a plurality of deposition and etching operations on one or more defects in the plurality of 3D models using one or more experimentally-controlled parameters;

determines a remaining defect quantity for each of the plurality of 3D models created by the virtual experiment following the performing of the plurality of deposition and etching operations; and identifies, based on the remaining defect quantity for each of the plurality of 3D models created by the virtual experiment, a lowest lithography exposure dose or dose range at which the one or more defects are repairable by the plurality of deposition and etching operations, and a display surface in communication with the at least one computing device, the display surface configured to display the 3D model in a 3D view.

18. The system of claim 17, wherein the defect mitigation module when executing further:
receives, via a graphical user interface in the virtual fabrication environment, one or more selections of the one or more experimentally-controlled parameters for the plurality of deposition and etching operations on one or more defects in the 3D model, wherein the one or more experimentally-controlled parameters include at least one of a deposition thickness, an etch depth, an aspect ratio dependence or a lateral to vertical ratio.

19. The system of claim 17, wherein the defect mitigation module when executing further:
performs in the virtual fabrication environment a plurality of deposition and etching operations on one or more rough resist lines in the 3D model;
determines a smoothness status of the one or more rough lines based on results of the performing of the plurality of deposition and etching operations on the one or more rough resist lines; and
identifies, based on the smoothness status of the one or more rough lines, a lowest lithography exposure dose or dose range at which the one or more rough lines meet a pre-determined smoothness threshold and the one or more defects are repairable.

20. The system of claim 17, wherein the defect mitigation module when executing further:
receives, via a graphical user interface in the virtual fabrication environment, one or more selections of parameters for the plurality of deposition and etching operations on the one or more rough resist lines in the 3D model,
wherein the one or more selections include one or more of a deposition rate, an etch rate, an aspect ratio dependence, a number of cycles or an isotropy parameter.

21. The system of claim 17, wherein the lithography exposure is Extreme Ultraviolet Lithography (EUV) exposure.

* * * * *